(12) United States Patent
Baker

(10) Patent No.: US 6,517,167 B2
(45) Date of Patent: Feb. 11, 2003

(54) WHEEL MOUNTED DECORATIVE MEMBER

(76) Inventor: Scott Baker, 5530 Kester Ave., Sherman Oaks, CA (US) 91411

( * ) Notice: Subject to any disclaimer, the term of this patent is extended or adjusted under 35 U.S.C. 154(b) by 0 days.

(21) Appl. No.: 09/948,436

(22) Filed: Sep. 10, 2001

(65) Prior Publication Data

US 2002/0125762 A1 Sep. 12, 2002

Related U.S. Application Data

(60) Provisional application No. 60/249,784, filed on Nov. 20, 2000.

(51) Int. Cl.$^7$ ................................................. B60B 7/04
(52) U.S. Cl. ........................... 301/37.25; 301/37.102; 301/37.38; 301/37.42
(58) Field of Search .................. 301/37.25, 37.101, 301/37.26, 37.102, 37.108, 37.109, 37.38, 37.372, 37.376, 37.42; 40/587

(56) References Cited

U.S. PATENT DOCUMENTS

| | | | | |
|---|---|---|---|---|
| 2,169,237 A | * | 8/1939 | Gasco | 40/587 |
| 2,548,070 A | * | 4/1951 | Ryan | 40/587 |
| 2,722,822 A | * | 11/1955 | Thomas | 301/37.38 |
| 2,869,262 A | * | 1/1959 | Lucas | 40/587 |
| 2,935,361 A | * | 5/1960 | Aske | 301/37.38 |
| 3,005,906 A | * | 10/1961 | Butler, Jr. | 301/37.38 |
| 3,317,247 A | * | 5/1967 | Lamme | 301/37.38 |
| 4,280,293 A | * | 7/1981 | Kovalenko et al. | 40/587 |
| 4,346,940 A | * | 8/1982 | Tatar | 301/37.38 |
| 4,447,091 A | * | 5/1984 | Nguyen et al. | 301/37.38 |
| 4,452,493 A | * | 6/1984 | Liggett | 301/37.38 |
| 4,974,909 A | * | 12/1990 | Patti et al. | 301/37.26 |
| 5,659,989 A | * | 8/1997 | Hsiao et al. | 301/37.101 |
| 6,045,195 A | * | 4/2000 | Okamoto | 301/37.42 |

* cited by examiner

Primary Examiner—S. Joseph Morano
Assistant Examiner—Long Bae Nguyen
(74) Attorney, Agent, or Firm—Roger A. Marrs

(57) ABSTRACT

A mounting assembly for a movable decorative member to be mounted on a rotatable wheel hub including a weighted mass having a mounting portion carrying a ball bearing disposed on a boss provided on a securement cap stud. The stud includes a threaded shaft engageable with the coupler or hub per se. The coupler is a flanged base or a base having radially projecting legs wherein either the flanged base or the radial legs are detachably connected with the hub. The bearing has a turning axis and the weighted mass decorative member is eccentric or off-center of the turning axis so that the decorative member downwardly depends from the bearing in a static appearing condition. A fixed, decorative member may be included which is secured to the hub so as to rotate therewith while the movable decorative member appears stationary.

14 Claims, 2 Drawing Sheets

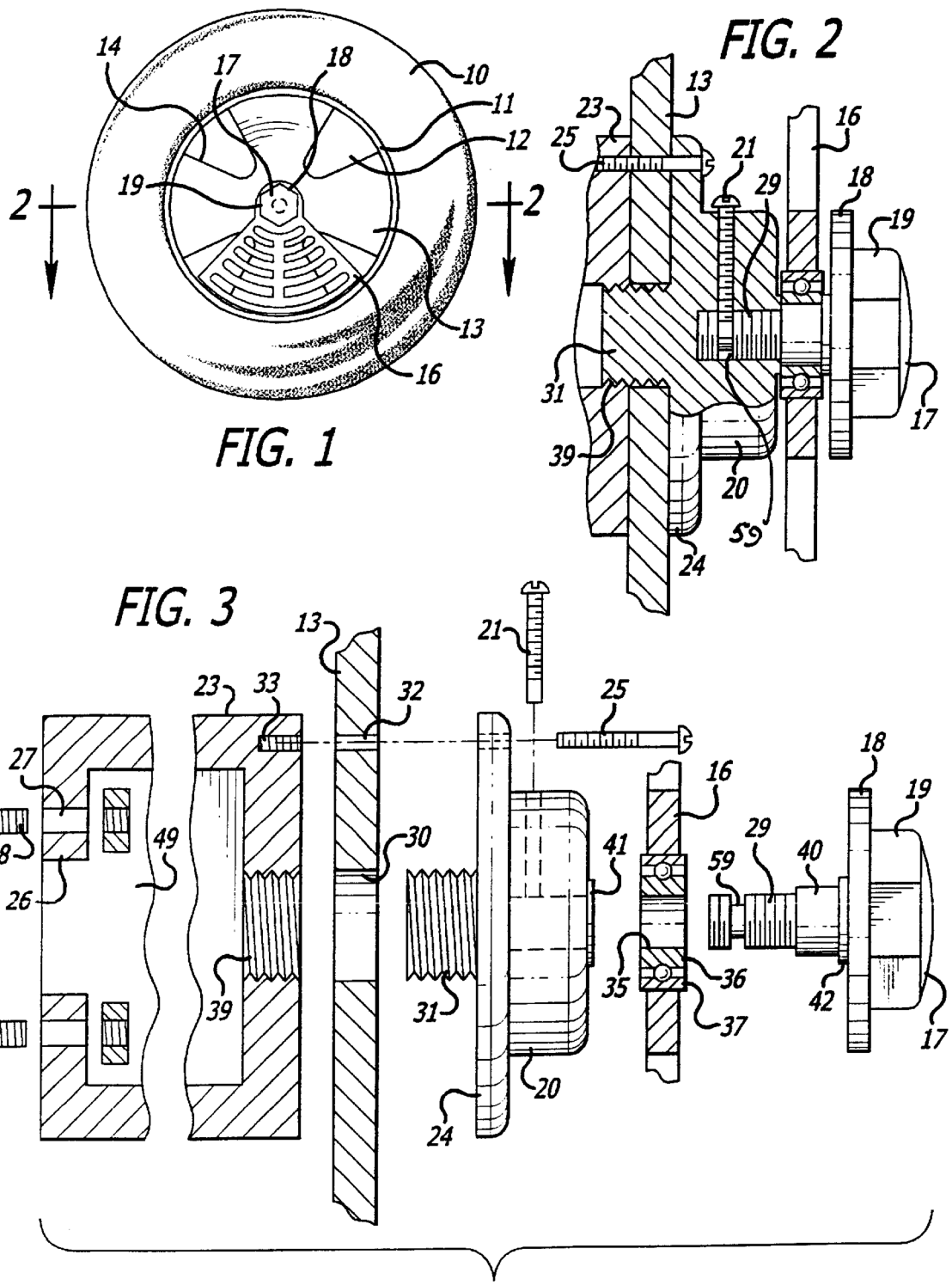

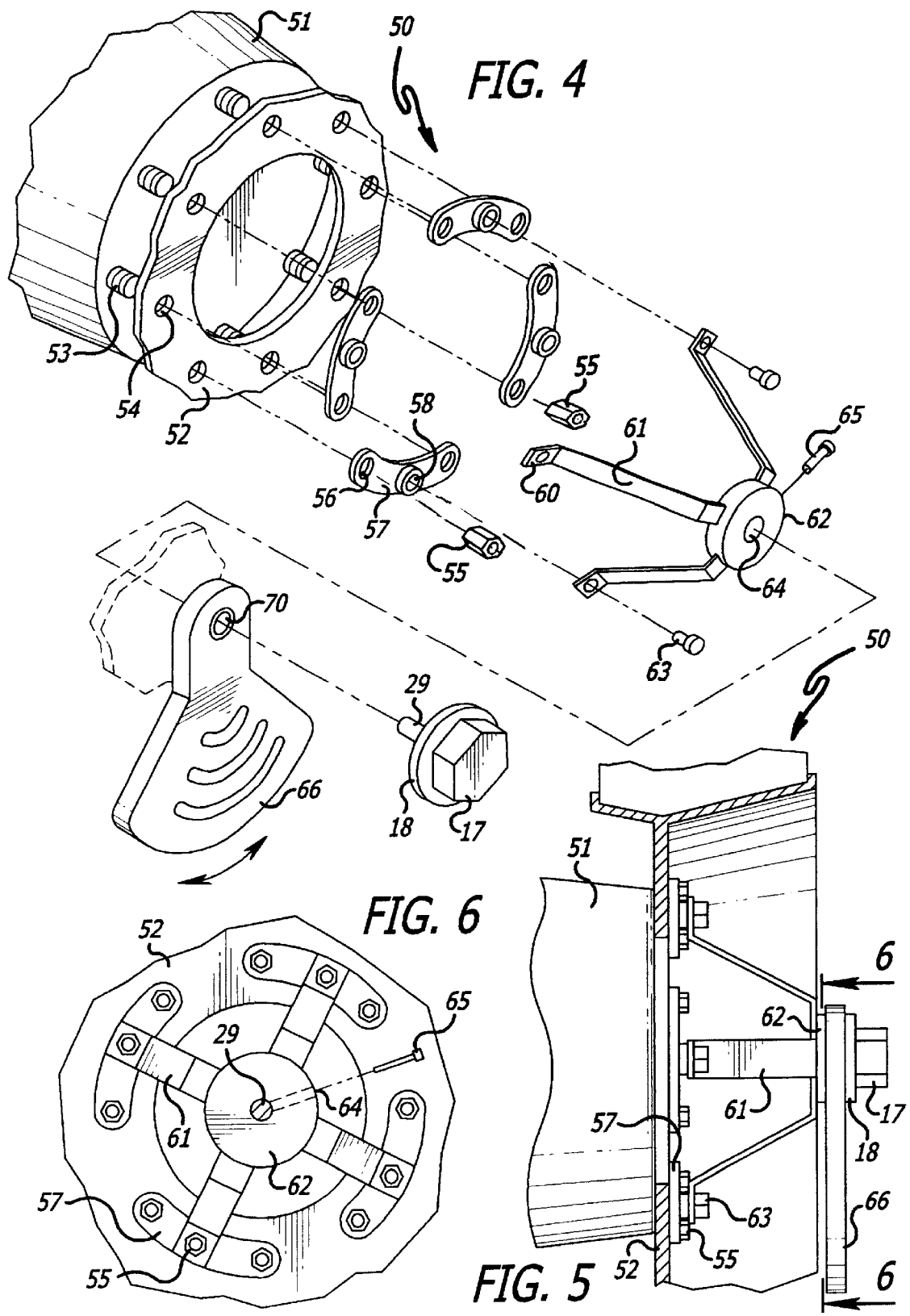

WHEEL MOUNTED DECORATIVE MEMBER

Priority Based on Ser. No. 60/249,784 Filed Nov. 20, 2000

BACKGROUND OF THE INVENTION

1. Field of the Invention

The present invention relates to the field of automotive accessories, and more particularly to a novel wheel assembly that employs interchangeable decorative members which remain or appear static as the wheel rotates.

2. Brief Description of the Prior Art

In the past, the conventional aluminum wheel design has employed elaborate "center" decorations and designs which require removal of substantial material from the wheel itself in order to create the design. The most limiting factor to the creative expression or enhancement of the "center" of the wheel is the direct effect the design has on the strength of the wheel due to the metal removal necessary to create the design. Therefore, problems and difficulties have been encountered with employing conventional wheel design, which stem largely from the fact that the design enhancement is greatly limited due to the required removal of wheel material which then greatly weakens the strength of the wheel. Also, wheel center design is generally unchangeable and requires the placement of new wheels with different designs to achieve design change.

Furthermore, prior centers for wheel visual enhancement are an integral non-removable strength requiring structures fixly secured to the wheel so as to rotate with the wheel as the vehicle mounting the wheels moves along a roadway. Thus, the variety of design and decorative options are greatly limited. For example, any design center enhanced by static viewing cannot be read or understood as a wheel rotates since such indicia becomes blurred. A decorative member or cover fix to a wheel is disclosed in U.S. Pat. No. 5,845,972.

Therefore, a long-standing need has existed to provide a novel wheel design member or decorative member arrangement which will permit a variety of design configurations to be placed in the central area of the wheel and which may appear to be or is stationary while the wheel rotates. Strength of the wheel will not be adversely affected and interchange ability of different designs should be accommodated.

SUMMARY OF THE INVENTION

Accordingly, the above problems and difficulties are avoided by the present invention which provides a wheel assembly that includes a decorative member incorporating a given design and which is not a load-bearing member and, therefore, creative expression is unlimited. In one form, the decorative member is mounted on the outer race of a bearing with an inner race mounted on an attachment means such as a threaded shank carried on a securement cap. The cap includes an outwardly projecting flange having a shoulder which bears against one side of the bearing inner race when the threaded shank is inserted through the inner race. The opposite side of the inner race bears against a shoulder of a coupler or base having an internally threaded bore which receives the threaded shank and as the cap is tightened, a clamping action secures the decorative member via a bearing in position between the respective shoulders. The coupler may include an enlarged flange that bears against a fixed decorative cover plate. The coupler, in one form, includes a threaded stud detachably engageable with internal threads of a mating threaded bore in a wheel hub. The decorative member rotates with the wheel since it is secured to a wheel hub fixedly attached to the wheel and the hub. A securement fastener means holds the collar to the hub while a retention fastener means connects the coupler or base with the cap shank.

A wheel collar, for example, is disclosed in more detail, as well as its attachment to the wheel, in my U.S. Pat. No. 5,845,972.

In another embodiment, attachment means such as the coupler joining the cap and the decorative member with the wheel may be a base to which the cap is attached with the bearing movably supporting the decorative member therebetween and the base having several legs radiating outwardly to terminate in pads for fastener connection to mounting plates carried on the cover plate or the wheel itself.

The inventive concept incorporates a wheel installation or mounting assembly permitting a movably mounted decorative member on a rotatable hub to remain static while the wheel is turning as a vehicle travels along a roadway. A fixed or stationary decorative member may be used separately or simultaneously in conjunction with the movably mounted decorative member.

Therefore, it is among the primary objects of the present invention to provide a novel wheel having at least one decorative member having a design center which is not subjected to loads and stresses normally encountered during road conditions.

Another object of the present invention is to provide a novel decorative member and mounting assembly which can be attached to a conventional wheel and which allows the wheel to rotate while the decorative member remains static or stationary.

Yet another object of the present invention is to provide a novel decorative wheel member mounting assembly which will permit quick interchangability of the member.

Still a further object of the present invention is to provide a novel wheel which has a mounting for a pair of decorative members, permitting interchangability of either member and which provides for at least one decorative member of the pair to be static while the wheel turns while the other decorative member is fixed to the wheel and rotates therewith.

A further object resides in providing a wheel having a mounting assembly for a pair of decorative members, wherein one member rotates with the wheel while the other remains in a static or stationary orientation as the wheel turns.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front elevational view illustrating the novel wheel display of the present invention having a decorative member fixed to a wheel for rotation therewith and a decorative member adapted to be in a static or stationary position during wheel rotation;

FIG. 2 is a transverse cross-sectional view of a mounting for the rotative decorative member or plate and for the static or stationary decorative member;

FIG. 3 is an exploded perspective view showing the components of the wheel display showing the mounting for the decorative members preparatory for installation on a wheel;

FIG. 4 is an exploded view of another embodiment for mounting a decorative member on a wheel utilizing the present invention.

FIG. 5 is a side elevational view of the mounting and decorative member shown in FIG. 5 in an assembled structure; and FIG. 6 is a cross-sectional view of the assembled structure as taken in the direction of arrows 6—6 of FIG. 5.

DESCRIPTION OF THE PREFERRED EMBODIMENT

Referring to FIGS. 1 and 2, a conventional wheel with a tire mounted thereon is indicated by numeral 10 and the wheel is indicated by numeral 11 representing the rim with a central hub area indicated by numeral 12. The hub area 12 is covered by a first decorative member 13 which has areas of material removed to provide a suitable shape, configuration or ornamentation. For example, material has been removed from the member 13 to provide a plurality of cut-outs or openings such as cut-out 14, which are arranged in ornamental relationship about the center of the member. The first decorative member 13 is fixed to the hub area and rotates as the wheel rotates. A second decorative member 16 is held in position on the wheel by means of a securement cap 17 having an outwardly extending flange 18 adjacent the second decorative member 16. The cap 17 includes a plurality of flats, such as flat 19, for receiving a suitable assembly tool such as a wrench or socket. The cap 17 is detachably secured to a mounting block, base, or coupler 20 with the second decorative member 16 therebetween and a lock fastener or bolt 21 passes through the body of coupler 20 into engagement with a recessed groove 59 in a mating threaded stud 29 projecting from the cap 17. Coupler 20 includes a flange 24 bearing against first decorative member 13. Fastener 25 secures the flange 24 to the end of a collar 23 which, in turn, is secured to the hub area 12 of the wheel.

It can be seen that the decorative representation carried by the members 13 and 16 in no way weakens or reduces the strength of the hub area 12 of the wheel. Also, by removing the securement cap 17, and coupler 20, the decorative members 16 and 13 can be readily changed so that replacement decorative members with different graphics or designs can be assembled with the wheel.

Referring now in detail to FIGS. 2 and 3, it can be seen that the assembly further includes circular collar 23 having an inner flange 26 which is provided with a circular arrangement of holes, such as hole 27, that are aligned with threaded hub studs 28 in the hub area 12. Studs 28 are carried on the wheel drum or hub and project through the holes 27 so that retaining nuts can be installed on the exposed ends of the studs. Thus, the collar 23 is fixedly attached to the wheel drum or hub and wheel in a secure manner.

The decorative member 13 includes a bore 30 for passing through a threaded stud 31 projecting from flange 24 into threaded bore 39. The fastener 25 can then be inserted through any one of multiple holes such as hole 32 and into threaded connection with an aligned hole 33 selected from a plurality of holes surrounding the central opening 39 in collar 23.

Regarding movable decorated member 16, it is to be noted that a bearing 35 mounts the member onto a boss 40 cantilevered away from flange 18 on cap 17. The inner race 36 mounts the bearing on the boss while the outer race 37 mounts the member 16 onto the bearing. The inner race 36 is clamped between a pair of shoulders 41 and 42 carried on the coupler 20 and cap 17 respectively. Therefore, the member 13, coupler 20 and cap 17 will rotate with the wheel since these components are fixedly secured to the collar 23 and the wheel. However, member 16 will hang downwardly under gravitational force and will not rotate with the wheel. The member 16 may take a variety of shapes and forms, as well as have decorative cut-outs, and may serve as a carrier member to detachably support other forms or decorative separate design members.

The hub area or portion of the wheel, indicated by numeral 12, may include a plurality of vent openings so that a flow of air can pass therethrough for cooling purposes with respect to the brake assembly and wheel drum assembly.

In view of the foregoing, it can be seen that the decorative members 13 and 16 provide a decoration for the central portion of the wheel and that the securement cap 17 and coupler 20 retain the decorative members 13 and 16 in position in cooperation with the hub or collar 23. The decorative members are available for quick change by removing the lock screws 21 and/or 25 followed by unscrewing the securement cap 17 and/or coupler 20 and removing the ornamental decorative members 16 or 13. Next, decorative members or plates with different designs are installed using the coupler 20 and cap 17 followed by threadably engaging fasteners 25 and 21.

Referring now in detail to FIGS. 4–6 inclusive, another embodiment of the invention is illustrated in the direction of arrow 50. A wheel hub 51 mounts the central area 52 of a wheel (not shown) by threaded studs 53 projected through holes 54 and held by nuts 55. The studs pass through holes 56 formed at opposite ends of each of a plurality of mounting plates 57. The center of each mounting plate includes a threaded socket 58 for supporting a pad 60 carried on the ends of legs 61 radiating outwardly from a base 62. Fasteners 63 secure the pads and, therefore the base, to the respective mounting plates 57. The base with the legs and pads take the place of the coupler 20 and/or collar 23 shown in FIGS. 1–3. The base 62 includes a threaded hole 64 for engaging with the threaded stud 29 of the cap 17. A lock fastener 65 retains the cap on the base 62 as previously described. Coupler 20 and/or base 62 are attachment means along with the cap 17 for retaining the mounting assembly together.

Disposed between the cap 17 and the base is a movable decorative member 66 mounted, as previously described, between a pair of shoulders by a bearing 70. The inner race is disposed between opposing shoulders on the base and the cap 17 respectively while the outer race carries the decorative member 66 which does not spin or turn when the wheel turns. Gravity holds the weighted decorative member 66 in a downward position while the wheel turns or rotates. The weighted mass of member 66 is eccentric to or off-set from the central axis of the bearing.

Therefore, in either embodiment, it can be seen that the one decorative member may turn with the wheel while another decorative member may remain stationary as the wheel turns. It is shown that the member 16 or member 66 can be used alone on in conjunction with decorative member 13.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a wheel mounted decorative assembly carried on a rotatable wheel having a hub, the combination comprising:
   a decorative member carried on said hub;
   attachment means for removably mounting said decorative member on said hub;
   said attachment means includes a body having a pressure surface bearing against said decorative member and with an outwardly projecting attachment member for attachment to said hub; and
   said attachment member is a threaded stud receivable in a threaded opening provided in said hub with said decorative member disposed between said pressure surface and said hub.

2. The assembly defined in claim 1 wherein:
   said attachment member is a set of legs carried on said body pressure surface and outwardly projecting therefrom in a spaced-apart radial pattern with each leg of said set terminating in secure engagement with said hub.

3. In a wheel mounted decorative assembly carried on a rotatable wheel having a hub in claim 1 the combination comprising:
   a second decorative member movably mounted on said attachment means body;
   a cap detachably connected to said attachment means body for retaining said second decorative member on said attachment body; and
   said first mentioned decorative member fixedly secured to said hub.

4. The assembly defined in claim 3 including:
   a bearing disposed between said second decorative member and said cap permitting movement of said second decorative member relative to said first mentioned decorative member.

5. The assembly defined in claim 4 wherein:
   said second decorative member is weighted so as to react as a pendulum on said bearing movable by gravitational force to downwardly depend from said bearing.

6. A wheel mounted decorative assembly comprising:
   a decorative member movably mounted on a rotatable hub;
   said decorative member having a bearing about which said decorative member rotates;
   a cap mounting said bearing and detachably coupled with said hub for retaining said decorative member with said hub;
   said decorative member having a mass eccentric with respect to said bearing whereby said decorative member remains stationary via gravitational force as said hub rotates;
   said bearing includes an inner race and an outer race;
   said cap having a boss supporting said inner race; and
   said outer race attached to said decorative member.

7. The assembly defined in claim 6 wherein:
   said cap includes a stud carrying said boss and terminating with a threaded end detachably engageable with said hub.

8. The assembly defined in claim 7 including:
   fastener means detachably joining said cap with said hub for retaining said cap, said bearing and said decorative member with said hub.

9. The assembly defined in claim 8 including:
   a coupler disposed between said decorative member and said hub;
   said coupler having a base with a plurality of legs outwardly radiating therefrom and each leg terminating with a pad; and
   fastening means releasably joining said pads with said hub.

10. The assembly defined in claim 9 including:
    a mounting plate fixed to said hub for detachably securing each of said pads to said hub;
    each mounting plate including an arcuate element having a pair of attachment fasteners connecting each mounting plate to said hub and a central fastener disposed between said pair of attachment fasteners for joining each of said pads to each of said respective mounting plates.

11. A decorative assembly for mounting a rotatable wheel hub comprising:
    a decorative member having a mounting portion and an outwardly flared mass portion carrying decorative indicia;
    a bearing carried on said mounting portion with said flared mass portion being eccentric with respect to a turning axis of said bearing;
    said flared mass portion being a weighted mass downwardly depending from said bearing so as to be stationary as the wheel hub rotates;
    a cap having a boss supporting said bearing and a threaded stud in detachable engagement with the hub.

12. The assembly defined in claim 11 wherein:
    said bearing includes an inner race fixed to said boss and an outer race fixed to said mounting portion and a plurality of ball bearings disposed between said inner race and said outer race.

13. The assembly defined in claim 12 including:
    a coupler disposed between said bearing and the wheel hub detachably coupling said decorative member with the wheel hub;
    said coupler includes a base having a central threaded opening for receiving said threaded stud and a plurality of outwardly projecting legs arranged in a spaced-apart radial arrangement from said base to terminate in fixed connection with the wheel hub.

14. The assembly defined in claim 13 including:
    fastener means carried on said base for releasably connecting said threaded stud with said base.

* * * * *